US009110255B2

(12) United States Patent
Lin et al.

(10) Patent No.: US 9,110,255 B2
(45) Date of Patent: Aug. 18, 2015

(54) OPTICAL CONNECTOR, OPTICAL TRANSMISSION DEVICE AND ASSEMBLY METHOD FOR OPTICAL TRANSMISSION DEVICE

(71) Applicant: OPTOMEDIA TECHNOLOGY INCORPORATION, Hsinchu County (TW)

(72) Inventors: Tung-Lou Lin, Hsinchu County (TW); Chih-Hung Chen, Hsinchu County (TW)

(73) Assignee: OPTOMEDIA TECHNOLOGY INCORPORATION, Hsinchu County (TW)

( * ) Notice: Subject to any disclaimer, the term of this patent is extended or adjusted under 35 U.S.C. 154(b) by 0 days.

(21) Appl. No.: 14/557,281

(22) Filed: Dec. 1, 2014

(65) Prior Publication Data

US 2015/0198774 A1   Jul. 16, 2015

(30) Foreign Application Priority Data

Jan. 15, 2014   (TW) .............................. 103101522 A

(51) Int. Cl.
*G02B 6/38* (2006.01)
*G02B 6/46* (2006.01)

(52) U.S. Cl.
CPC ............ *G02B 6/3887* (2013.01); *G02B 6/3886* (2013.01); *G02B 6/3893* (2013.01); *G02B 6/46* (2013.01)

(58) Field of Classification Search
CPC ...... G02B 6/46; G02B 6/3886; G02B 6/3887; G02B 6/3893
USPC .......................................................... 385/57
See application file for complete search history.

(56) References Cited

U.S. PATENT DOCUMENTS 5,481,634 A * 1/1996 Anderson et al. ................ 385/76
6,234,683 B1 * 5/2001 Waldron et al. .................. 385/78
(Continued)

FOREIGN PATENT DOCUMENTS

| TW | 440733 | 6/2001 |
| TW | M343805 | 11/2008 |
| WO | WO9932914 A1 | 7/1999 |

OTHER PUBLICATIONS

Naoko Shimoji et al., Development of Mini-MPO Connector, Furukawa Review, No. 18. 1999.
Office Action dated May 25, 2015 for counterpart Taiwan application 103101522.
English abstract translation of the Office Action dated May 25, 2015 for counterpart Taiwan application 103101522.
(Continued)

*Primary Examiner* — Akm Enayet Ullah
(74) *Attorney, Agent, or Firm* — WPAT, P.C.; Anthony King

(57) ABSTRACT

The present invention discloses an optical connector comprising a first connector and a second connector. The first connector includes: a first space to accommodate a first fiber joint and a part of a first optical transmission line; a first front opening to expose a first signal transmission interface of the first fiber joint; a first rear opening through which the first optical transmission line connects with the first fiber joint; and a first fastening. The second connector includes: a second space to accommodate a second fiber joint and a part of a second optical transmission line; a second front opening to expose a second signal transmission interface of the second fiber joint; a second rear opening through which the second optical transmission line connects with the second fiber joint; and a second fastening to be fixed to the first fastening in a nondestructive detachable way.

28 Claims, 22 Drawing Sheets

(56) References Cited

U.S. PATENT DOCUMENTS

| | | | |
|---|---|---|---|
| 7,572,065 B2* | 8/2009 | Lu et al. | 385/78 |
| 7,744,286 B2* | 6/2010 | Lu et al. | 385/53 |
| 8,905,648 B2* | 12/2014 | Zhang | 385/60 |
| 8,953,924 B2* | 2/2015 | Cote et al. | 385/137 |
| 2002/0126959 A1* | 9/2002 | Keselman et al. | 385/55 |

OTHER PUBLICATIONS

Search report dated May 25, 2015 for counterpart Taiwan application 103101522.
English abstract translation of TW M343805.
TW 440733 is also published as WO9932914A1.

* cited by examiner

OPTICAL CONNECTOR, OPTICAL TRANSMISSION DEVICE AND ASSEMBLY METHOD FOR OPTICAL TRANSMISSION DEVICE

BACKGROUND OF THE INVENTION

1. Field of the Invention

The present invention relates to an optical connector, an optical transmission device and an assembly method for an optical transmission device, especially to an optical connector, an optical transmission device and an assembly method capable of nondestructive detachment.

2. Description of Related Art

In recent years, as the demand for data throughput and transmission speed rises day by day, the traditional way in using copper cables as the data transmission medium is gradually out of date; therefore fiber transmission has taken the place of copper transmission and becomes the major medium for high speed transmission. However, compared with copper transmission, fiber transmission asks for extremely high precision in the alignment of assembly. If some influence such as an external force to a certain degree, user's improper operation or a great amount of insertion/desertion actions happens, the transmission end, relay end or reception end of fiber transmission will be out of normal operation. In order to tackle the above-mentioned problems for a short-distance wired connection such as the indoor connection or the connection between devices, a known solution is to replace the whole fiber transmission line and the transceiver components at the terminals of the fiber transmission line. But if the wire layout is invisible or hard to be detached and reinstalled, the said replacement will be a tough job and lead to a significant cost. Seeing that the overall replacement solution is problematic, another known solution simplifies the detachment and reinstallation of the fiber transmission line and the transceiver components thereof by using a connector. One type of the connector is a multi-fiber push-on/push-off connector (MPO connector). Unfortunately, MPO connector is an independent adaptor; although it is operable to carry out the optical coupling between two fiber transmission lines, it can't be integrated with the terminals of the fiber transmission lines; besides, it is complicated in its structure and components and therefore only applicable to some specific optical transmission products, which thereby leads to a higher cost; moreover, it also leaves users the concern of insertion loss and reflection loss. Another type of said connector is a mechanically transferable connector (MT connector) which allows two fiber transmission lines to couple with each other by the corresponding structure design of the terminals of the two fiber transmission lines. However, MT connector needs a pinch clamp to immobilize the two transmission lines. For some applications requiring a lot of detachment and reinstallation actions, the design with the pinch clamp is annoying and its volume consumes much space; accordingly, this solution will also cause a lot of inconvenience in wiring working.

People who are interested in the prior arts may refer to the following document: "Naoko Shimoji, Jun Yamakawa and Masato Shiino: "Development of Mini-MPO Connector", Furukawa Review, No. 18, 1999.".

SUMMARY OF THE INVENTION

In consideration of the problems of the prior arts, an object of the present invention is to provide an optical connector, an optical transmission device and the assembly method thereof for making improvements over the prior arts.

The present invention discloses an optical connector. An embodiment of said optical connector comprises a first connector and a second connector operable to connect with each other. The first connector is operable to receive a part of a first optical transmission module, including: a first space operable to accommodate a first fiber joint and a portion of a first optical transmission line; a first front opening operable to expose a first signal transmission interface of the first fiber joint after the first space accommodates the part of the first optical transmission module; a first rear opening, smaller than the first front opening, operable to be the window for the first optical transmission line connecting with the first fiber joint after the first space accommodates the part of the first optical transmission module; and a first fastening. Besides, the second connector is operable to receive a part of a second optical transmission module, including: a second space operable to accommodate a second fiber joint and a portion of a second optical transmission line; a second front opening operable to expose a second signal transmission interface of the second fiber joint after the second space accommodates the part of the second optical transmission module; a second rear opening, smaller than the second front opening, operable to be the window for the second optical transmission line connecting with the second fiber joint after the second space accommodates the part of the second optical transmission module; and a second fastening operable to be fixed to the first fastening in a detachable way, so as to connect the first and second connectors, wherein the detachable way is nondestructive.

The present invention also discloses an optical transmission device. An embodiment of said optical transmission device comprises: a first optical transmission module including a first fiber joint and a first optical transmission line; a second optical transmission module including a second fiber joint and a second optical transmission line; a first connector; and a second connector. Said first connector includes: a first space operable to accommodate the first fiber joint and a portion of the first optical transmission line; a first front opening operable to expose a first signal transmission interface of the first fiber joint; a first rear opening, smaller than the first front opening, operable to be the window for the first optical transmission line connecting with the first fiber joint; and a first fastening. Said second connector includes: a second space operable to accommodate the second fiber joint and a portion of the second optical transmission line; a second front opening operable to expose a second signal transmission interface of the second fiber joint; a second rear opening, smaller than the second front opening, operable to be the window for the second optical transmission line connecting with the second fiber joint; and a second fastening operable to be fixed to the first fastening in a detachable way, so as to connect the first and second connectors, wherein the detachable way is nondestructive.

The present invention further discloses an assembly method for an optical transmission device, operable to assemble a connector and an optical transmission module. An embodiment of said assembly method comprises the following steps: providing a housing including a space, a front opening and a rear opening in which the housing pertains to a connector and the rear opening is smaller than the front opening; making an optical transmission line pass through the rear opening, the space and the front opening and thereby exposing a part of the optical transmission line to the environment outside the space; providing an optical joint in which the optical joint and the optical transmission line pertains to an optical transmission module; connecting the optical transmission line with the optical joint; after connecting the optical transmission line with the optical joint, making a signal transmission interface of the fiber joint smooth; and moving the optical transmission line and the fiber joint to thereby set the fiber joint inside the space.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The following description uses language by referring to terms in the field of the present invention. If any term is defined in this specification, such term should be explained accordingly. Besides, the connection between objects or events in the disclosed embodiments can be direct or indirect provided that these embodiments are still practicable under such connection. The mentioned "indirect" means that an intermediate object or a physical space is existed between the objects, or an intermediate event or a time interval is existed between the events. In addition, the following description relates to an optical connector, an optical transmission device and an assembly method of an optical transmission device, and thus the known detail in this filed will be omitted if such detail has little to do with the features of the present invention. Furthermore, the shape, size, and scale of any element and the step sequence of any flow chart in the disclosed figures are just exemplary for understanding, not for limiting the scope of this invention.

Besides, each embodiment in the following description includes one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The present invention discloses an optical connector, an optical transmission device and an assembly method for an optical transmission device. Said device and method are applicable to an optical transmitter, an optical receiver and an optical transceiver, and have the advantages of structure simplification, low manufacturing costs, and convenience in applications in comparison with the prior arts. People of ordinary skill in the art can choose components or steps equivalent to those described in this specification to carry out the present invention, which means that the scope of this invention is not limited to the embodiments in the specification. On account of that some element of the device invention could be known, the detail of such element will be omitted provided that this omission nowhere dissatisfies the specification and enablement requirements. Besides, the assembly method of the present invention can be used to fabricate the optical transmission device of the present invention or its equivalent; therefore, the following description will abridge the hardware detail of the assembled product but put the emphasis on the steps provided that the remaining disclosure is still enough for understanding and enablement.

Figure 1:
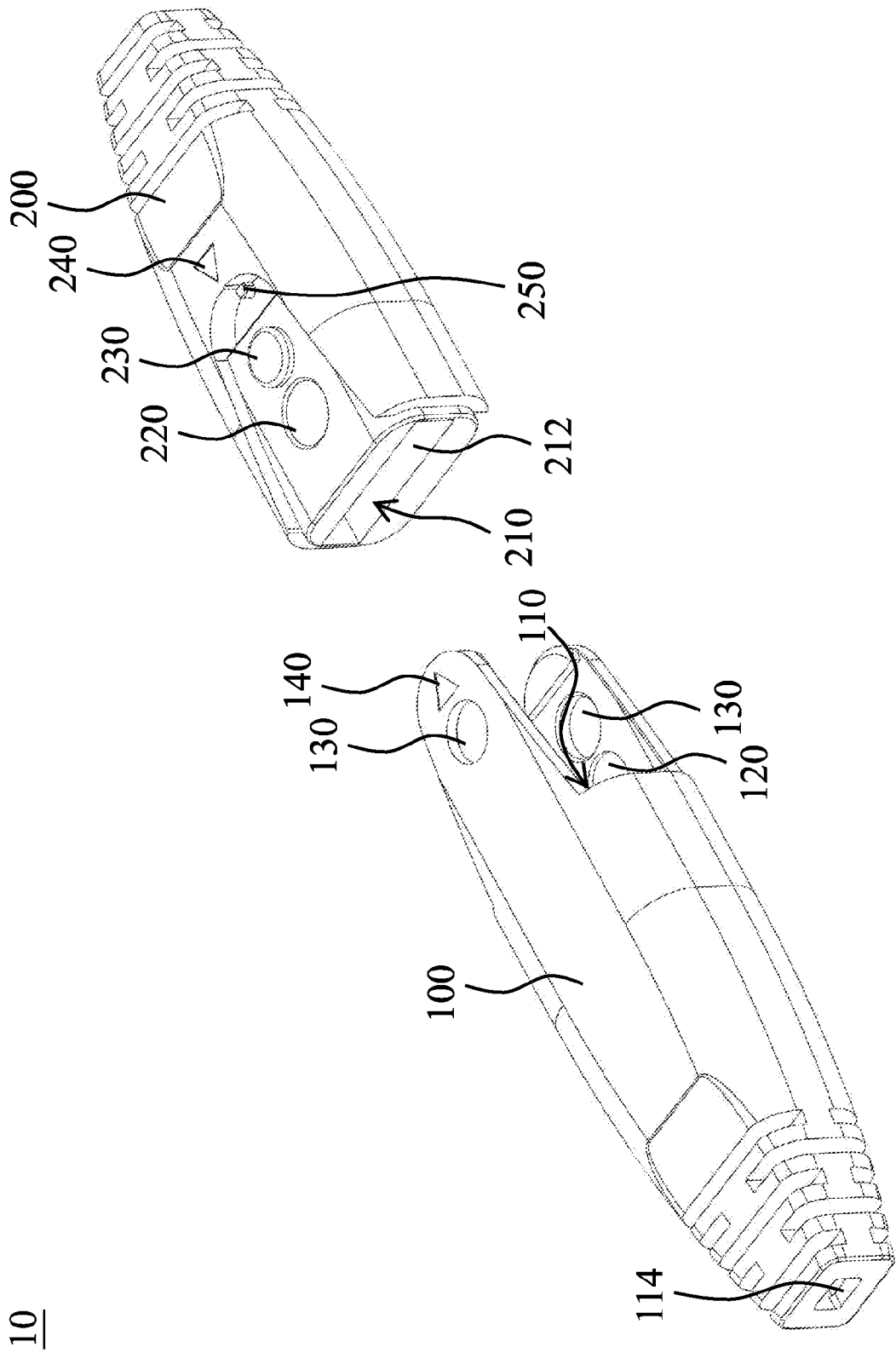
FIG. 1 illustrates an embodiment of the optical connector of the present invention.
Figure 2A:
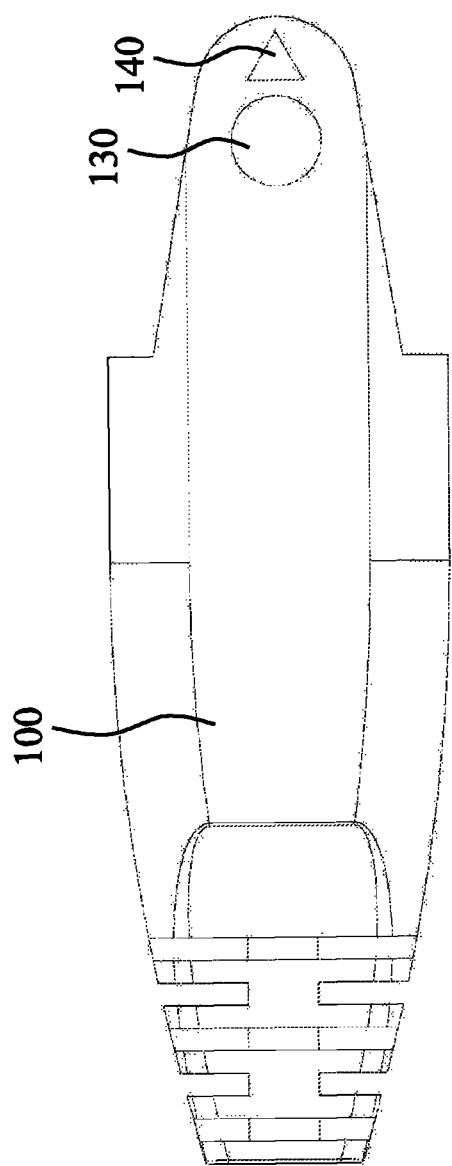
FIG. 2a illustrates a top view of the first connector in FIG. 1.
Figure 2B:
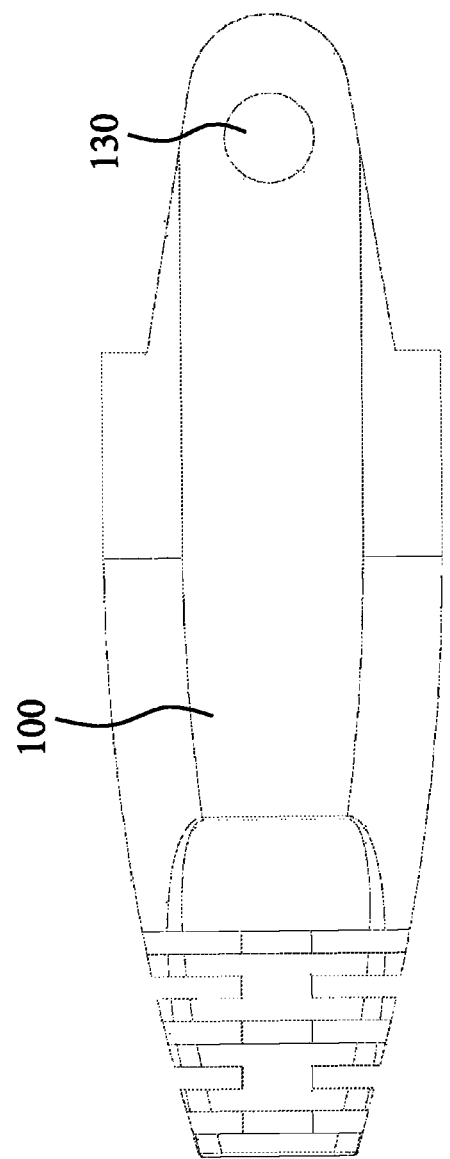
FIG. 2b illustrates a bottom view of the first connector in FIG. 1.
Figure 2C:
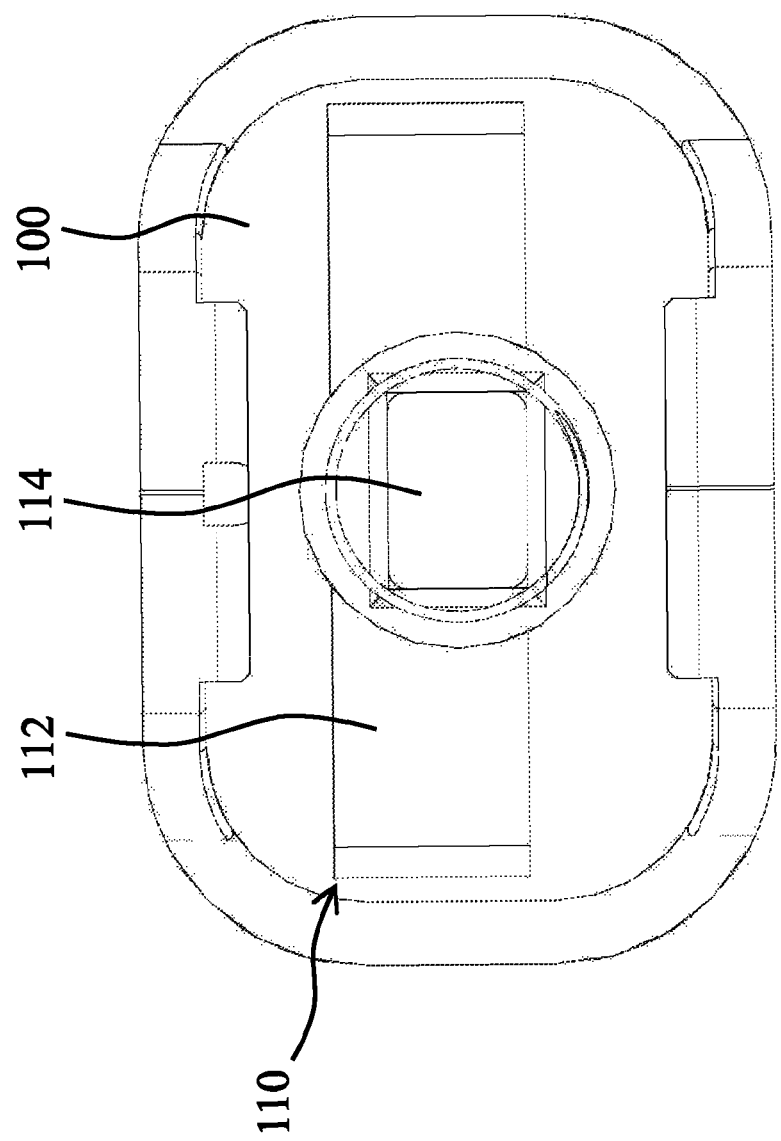
FIG. 2c illustrates a front view of the first connector in FIG. 1.
Figure 2D:
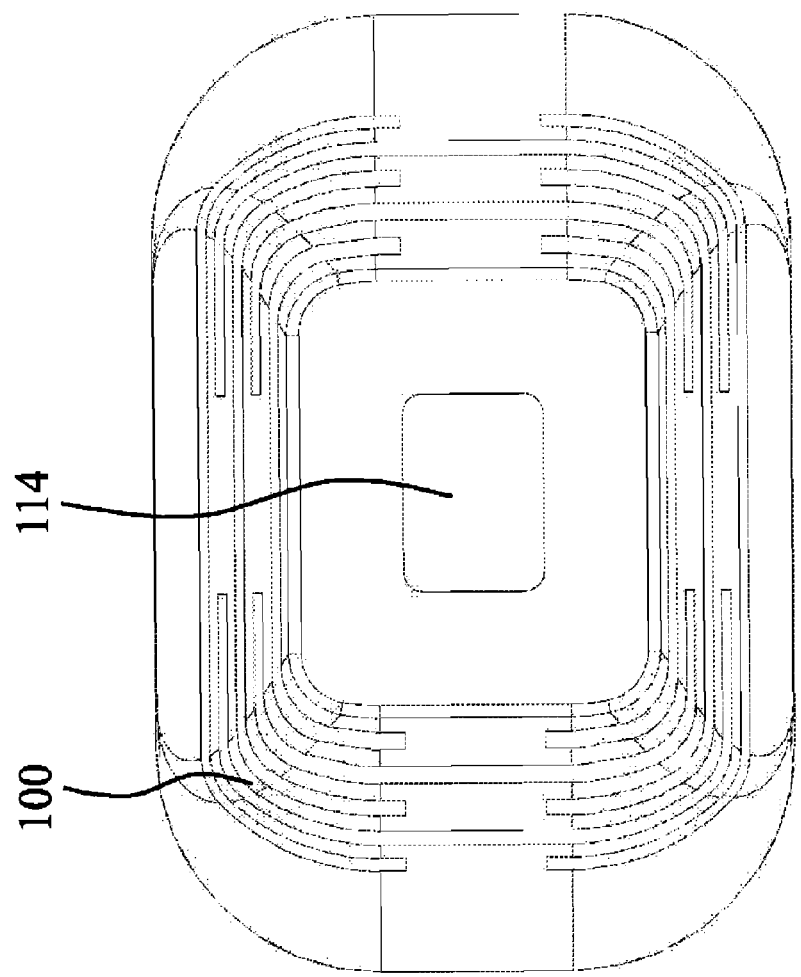
FIG. 2d illustrates a back view of the first connector in FIG. 1.
Figure 3A:
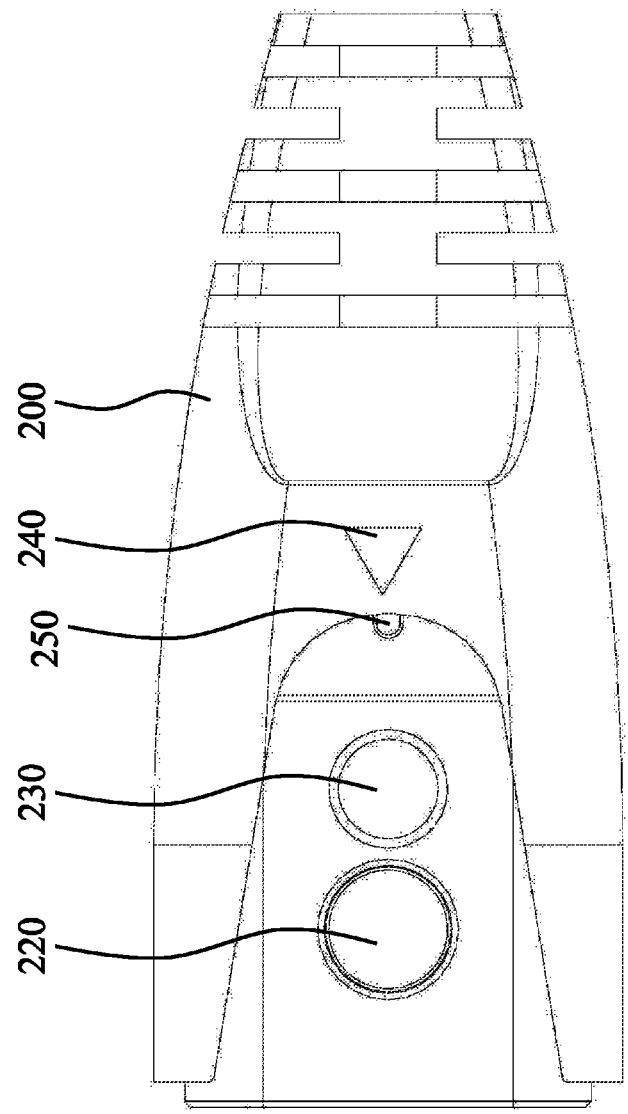
FIG. 3a illustrates a top view of the second connector in FIG. 1.
Figure 3B:
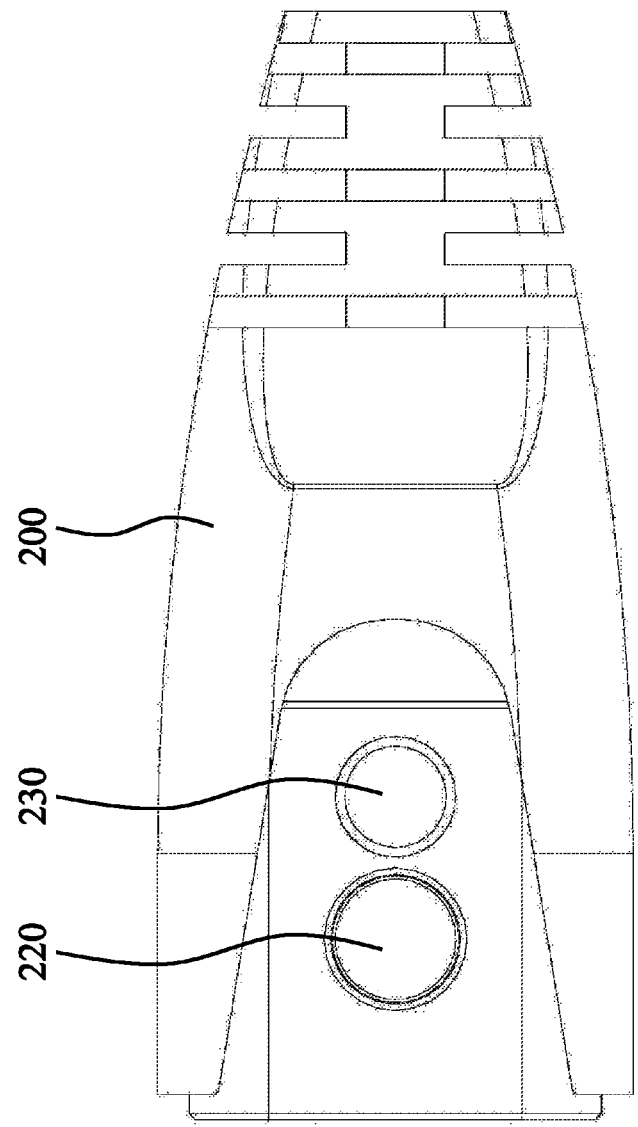
FIG. 3b illustrates a bottom view of the second connector in FIG. 1.
Figure 3C:
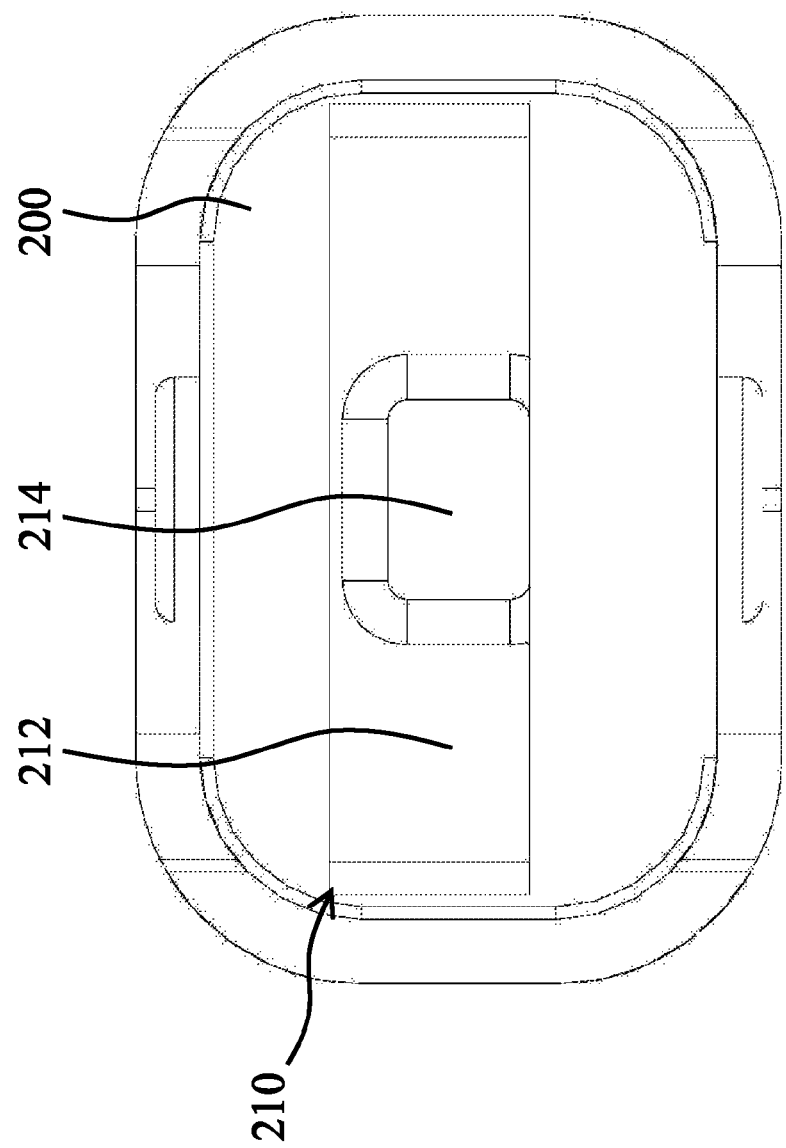
FIG. 3c illustrates a front view of the second connector in FIG. 1.
Figure 3D:
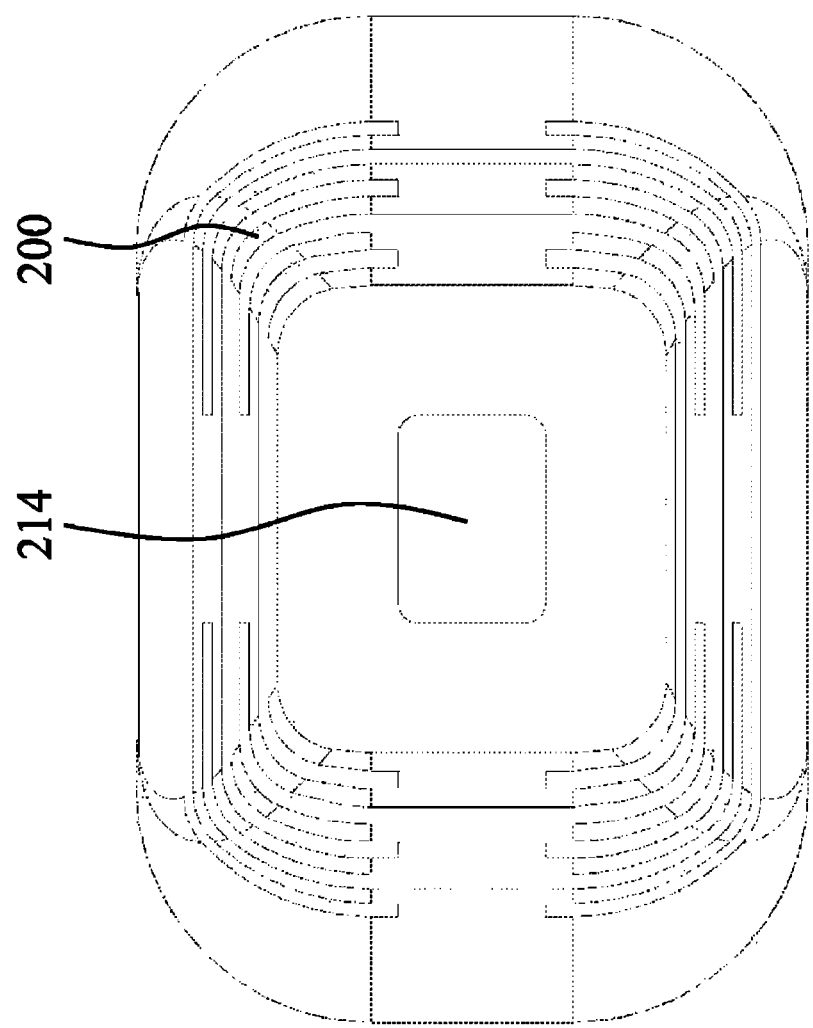
FIG. 3d illustrates a back view of the second connector in FIG. 1.

Please refer to FIG. 1 through FIG. 3d. FIG. 1 illustrates an embodiment of the optical connector of the present invention; FIG. 2a through FIG. 2d illustrates the first connector of the optical connector of FIG. 1 in different angles of view; and FIG. 3a through FIG. 3d illustrates the second connector of the optical connector of FIG. 1 in different angles of view. As it is shown in the figures, the optical connector 10 comprises a first connector 100 and a second connector 200. The first connector 100 is operable to receive a part of a first optical transmission module, and includes: a first space 110; a first front opening 112; a first rear opening 114; and a first fastening 120. Said first space 110 is operable to accommodate a first fiber joint and a portion of a first optical transmission line of the first optical transmission module; said first front opening 112 is operable to expose a first signal transmission interface of the first fiber joint after the first space 110 accommodates the part of the first optical transmission module; said first rear opening 114 is operable to be the window for the first optical transmission line connecting with the first fiber joint after the first space 110 accommodates the part of the first optical transmission module, and smaller than the first front opening 112 to prevent the first fiber joint from detachment; and said first fastening 120 is integrated into the first connector 100 as a whole or installed as a part of the first connector 100, and operable to combine the first connector 100 with the second connector 200. Besides, said second connector 200 is operable to receive a part of a second optical transmission module, including: a second space 210; a second front opening 212; a second rear opening 214 and a second fastening 220. Said second space 210 is operable to accommodate a second fiber joint and a portion of a second optical transmission line of the second optical transmission module; said second front opening 212 is operable to expose a second signal transmission interface of the second fiber joint after the second space accommodates the part of the second optical transmission module; said second rear opening 214 is operable to be the window for the second optical transmission line connecting with the second fiber joint after the second space accommodates the part of the second optical transmission module, and smaller than the second front opening 212 to prevent the second fiber joint from detachment; and said second fastening 220 is integrated into the second connector 200 as a whole or installed as a part of the second connector 200, and operable to be fixed to the first fastening 120 in a detachable way, so as to connect the first and second connectors 100, 200 firmly. Said detachable way is nondestructive, and endurable for frequent attachment and detachment.

Please refer to FIG. 1 through FIG. 3d again. The foresaid detachable way may adopt any nonpermanent and nondestructive connection technique such as magnetic attraction, flexible contact, frictional contact, mechanical position-limiting designs, and etc. For example, the front end of the first connector 100 is extended to thereby include an upper extension portion and a lower extension portion; each of the interiors of the upper and lower extension portions has an element alignment structure (e.g. the pad recess 710 in FIG. 7) for the placement of an iron element (e.g. the iron pad 720 in FIG. 7), so that the element alignment structure and the iron element constitute said first fastening 120 (as it is shown in FIG. 1); meanwhile, each of the top and bottom sides of the second connector 200 is designed to have a magnet holding structure (e.g. the recess 730 in FIG. 7) for the installation of a magnet (e.g. the NdFeB magnet (a.k.a. Neodymium magnet) 740 in FIG. 7), so that the magnet holding structure and the magnet constitute said second fastening 220 (as it is shown in FIG. 1). Accordingly, when the first and second connectors 100, 200 are joined together, since the positions of the iron elements and the magnets are corresponding to each other, the first and second fastenings 120, 220 are operable to accomplish the function of nonpermanent attachment and nondestructive detachment through the mutual attraction of the iron element and the magnet. For another example, the front end of the first connector 100 is extended to thereby include a flexible upper extension portion and a flexible lower extension portion. Each of the flexible upper and lower extension portions has a recess or a protrusion (e.g. the through hole 130 in FIG. 1 through FIG. 2b) in place of the first fastening 120 or as an auxiliary aid for the first fastening 120; in the meantime, each of the top and bottom sides of the second connector 200 has a protrusion or recess (e.g. the bump 230 of FIG. 1 and FIG. 3a through FIG. 3b) to take the place of the second fastening 220 or assist it in fixation. Therefore, when the first and second connectors 100, 200 are joined together, since the positions and outlines of the recesses and protrusions are matching, the first and second connectors are able to stay together firmly; besides, since the extension portions of the first connector 100 is flexible, a user may expand the two flexible extension portions to accomplish the purpose of nondestructive detachment. Please note that the given description of the attachment and detachment manners are just exemplary for understanding, and people of ordinary skill in the art may make alterations according to the fore-disclosed illustration and their own requirements. For instance, each of the first and second connectors 100, 200, instead of only one of them, includes an iron element and a magnet as a fastening, so as to achieve the function of attachment and detachment; for another instance, each of the first and second connectors 100, 200 rather than only one of them has a recess and a protrusion through which the two connectors 100, 200 are able to be joined together or separated from each other; for a further instance, the first and second connectors 100, 200 may adopt at least two manners of magnetic attraction, flexible contact, frictional contact and position-limiting designs to realize the function of detachment and reinstallation. Such kinds of modifications are embraced by the scope of the present invention. Please also note that in order to make the wiring working of long-distance optical transmission line easy, the first connector 100 may further include two through holes 130 (e.g. it is shown in FIG. 1, and FIG. 2a through FIG. 2b) which are not only operable to be hauled by external force after the first connector 100 receives the first fiber joint and the part of the first optical transmission line, but also operable to be treated as a fastening to thereby guide or assist the first and second connectors 100, 200 in assembly (as it is described in the aforementioned examples).

On the basis of the above disclosure, please refer to FIG. 1 through FIG. 3d once more. In order to make sure the coupling efficiency between the first and second transmission modules acceptable, each of the first and second connectors 100, 200 may adopt a foolproof design such as a design other than the design of central symmetry type, so that the two connectors 100, 200 are operable to be joined together in a predetermined alignment manner. In other words, if a connection process of the two connectors 100, 200 fails to conform to the predetermined alignment manner, the connection process will not go smoothly or some trouble will cause the attention of users. Through this foolproof design, the convenience in usage is improved while the prior art such as the MPO connector nowhere teaches such kind of feature. Here are some examples of the foolproof design. In an example, the first and second connectors 100, 200 include identification marks 140, 240 respectively, each of which is set at only one side for recognition and proper connection; in another example, the first and second connectors 100, 200 include a first foolproof design (e.g. a tenon pit (not shown)) and a second foolproof design (e.g. the tenon 250 in FIG. 1) respectively, and the two foolproof designs are matching in their outlines for proper connection; in a further example, the front openings 112, 212 of the first and second connectors 100, 200 are set aside from the center, so that one of the connectors 100, 200 can't engage with the other one when it is set upside down; in yet a further example, the first and second connectors 100, 200 may adopt at least two of the above-mentioned foolproof designs to ensure proper connection. However, the first and second connectors 100, 200 may or may not adopt a symmetric or asymmetric design; meanwhile, the first and second fiber joints may employ an asymmetric design (e.g. a fiber signal transmission hole and/or an alignment design may be set at a position other than the center of the signal transmission interface of the fiber joint (as it is shown in FIGS. 5c, 5e, 6c, and 7)) so as to confine the connection between the first and second connectors to a predetermined alignment manner, or the first and second fiber joints may employ a symmetric design which allows the first and second connectors 100, 200 to be joined under no prescribed alignment requirement as long as the coupling efficiency and the stability of the connection are acceptable.

Figure 4:
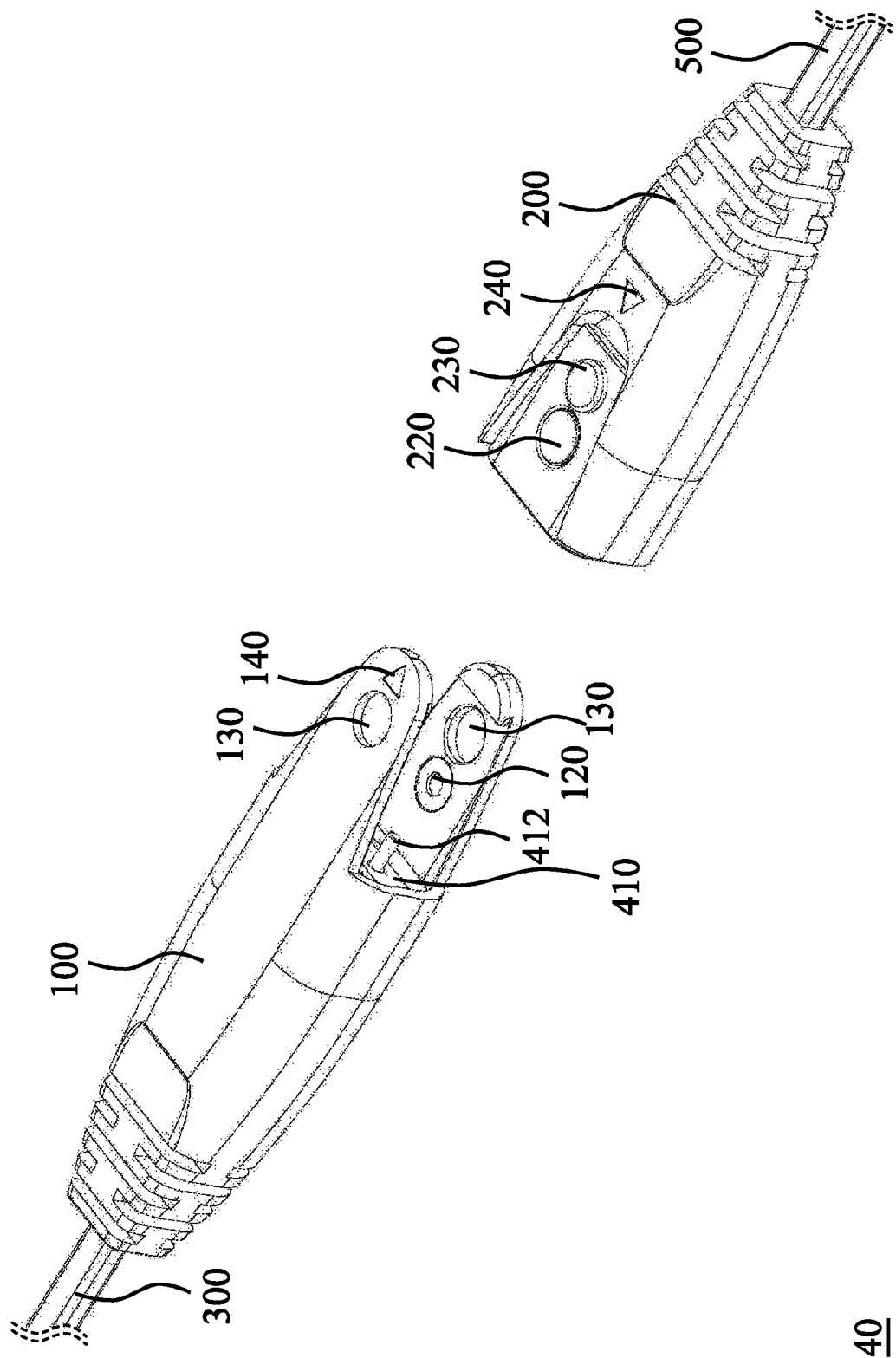
FIG. 4 illustrates an embodiment of the optical transmission device of the present invention.
Figure 5A:
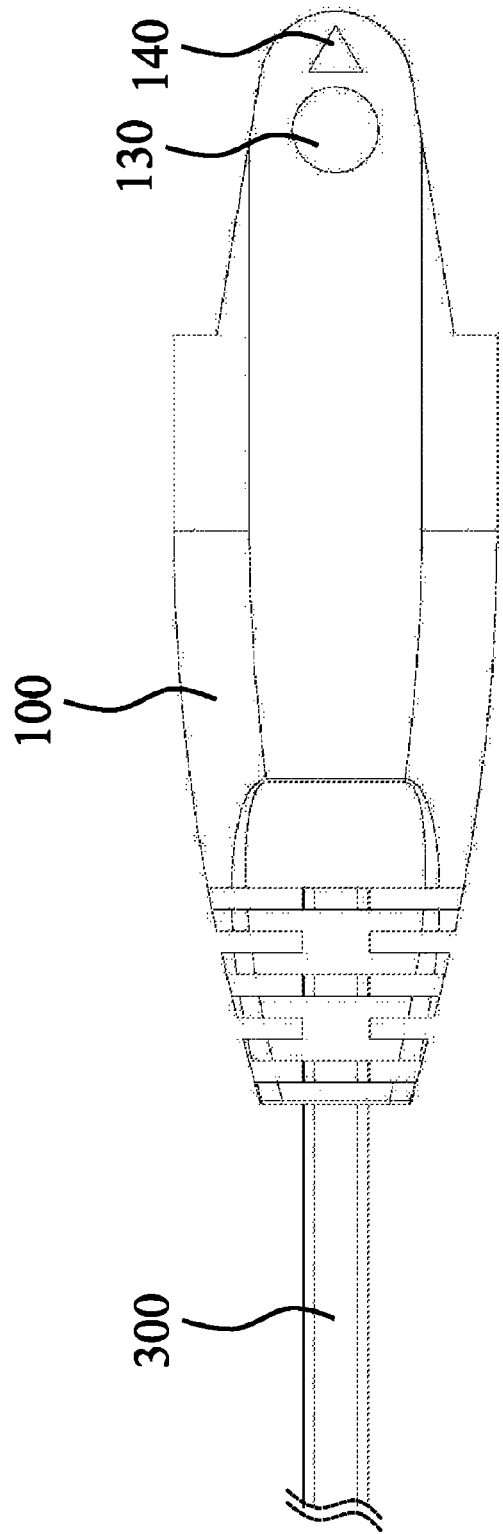
FIG. 5a illustrates a top view of the assembly of the first connector and the first optical transmission module in FIG. 4.
Figure 5B:
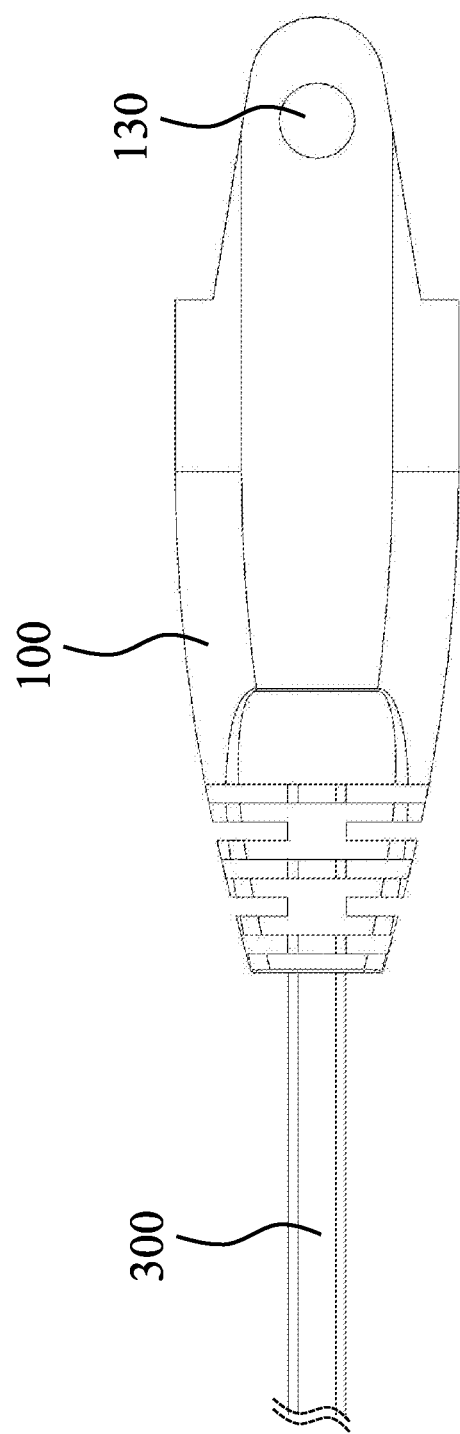
FIG. 5b illustrates a bottom view of the assembly of the first connector and the first optical transmission module in FIG. 4.
Figure 5C:
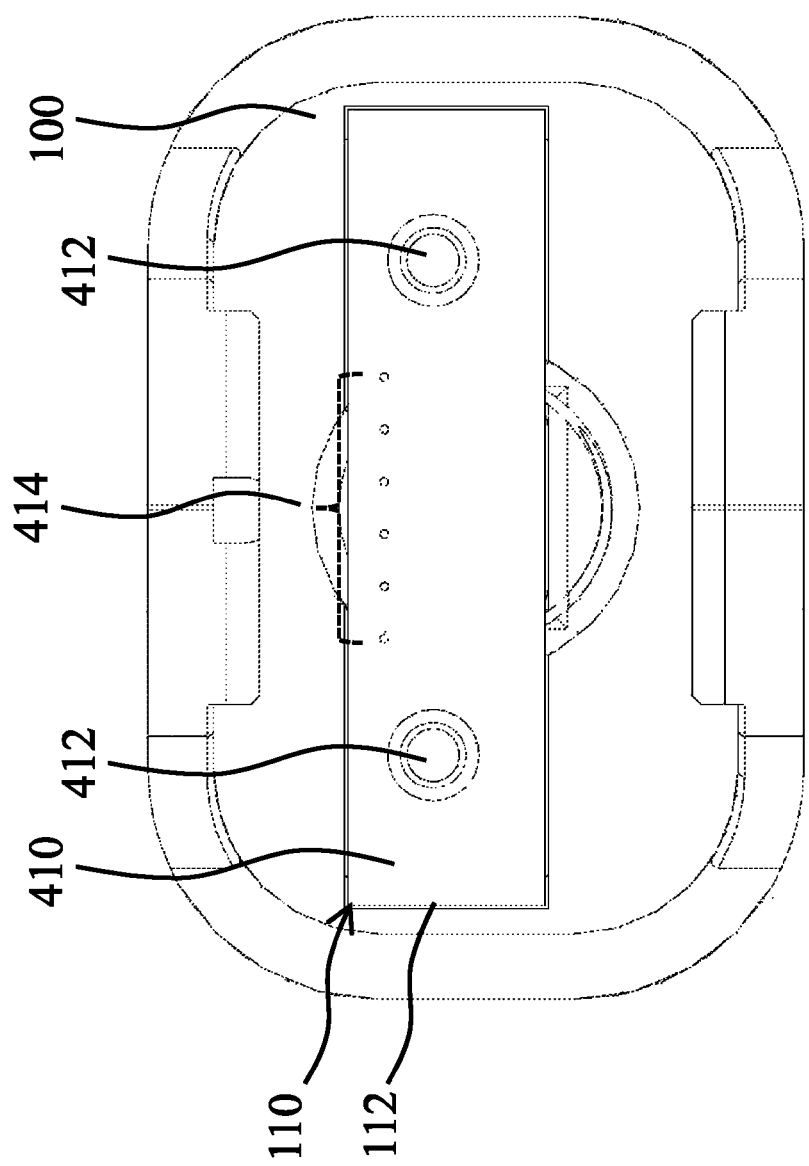
FIG. 5c illustrates a front view of the assembly of the first connector and the first optical transmission module in FIG. 4.
Figure 5D:
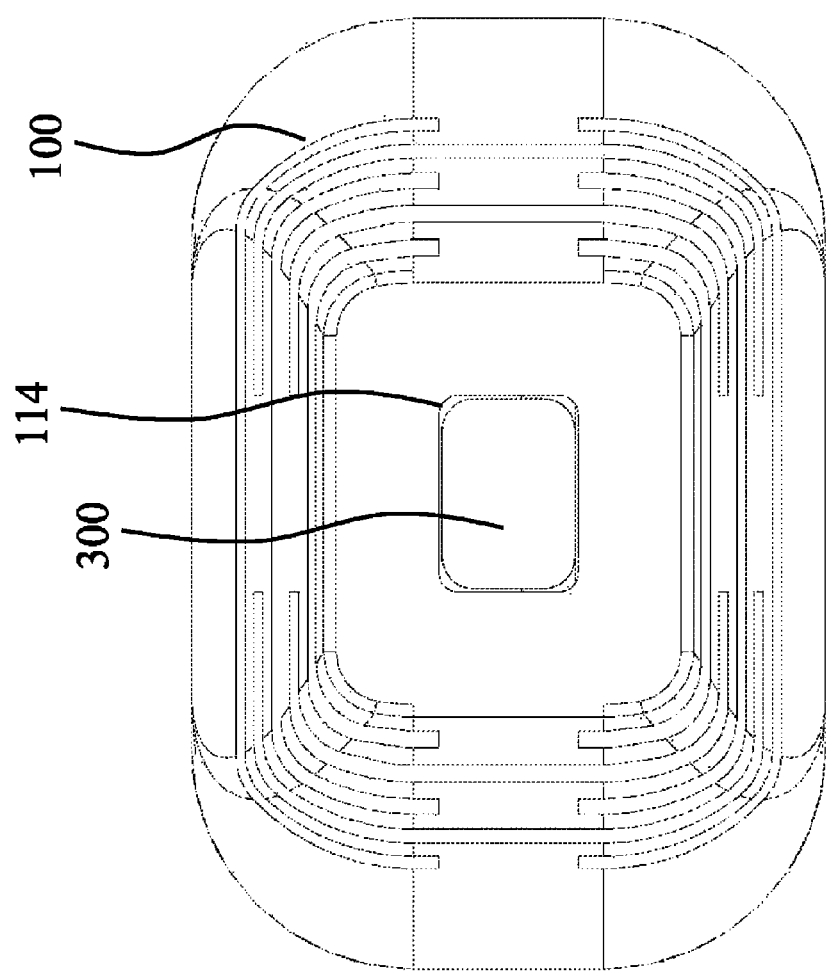
FIG. 5d illustrates a back view of the assembly of the first connector and the first optical transmission module in FIG. 4.
Figure 5E:
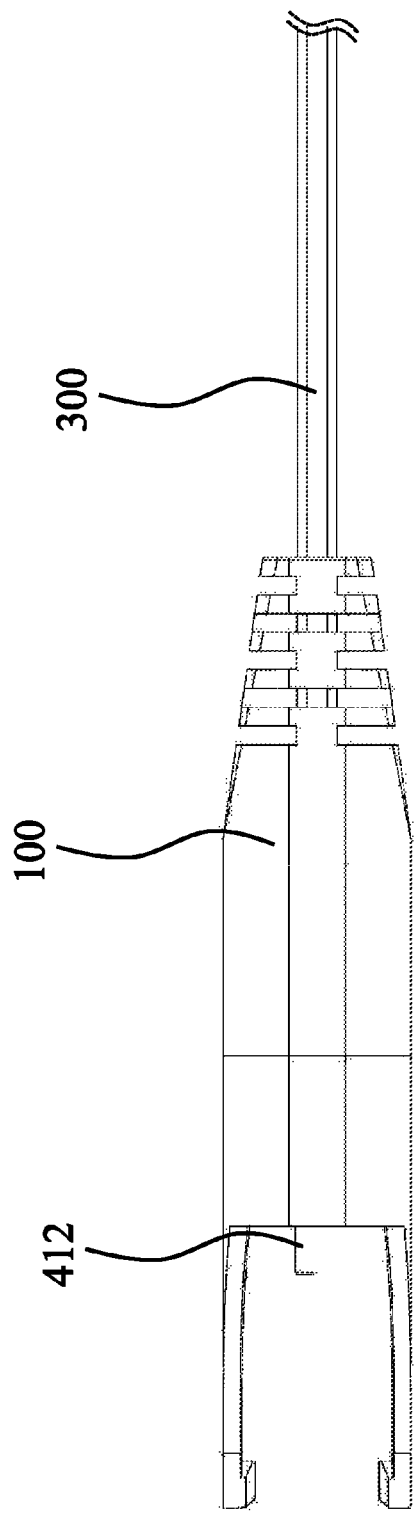
FIG. 5e illustrates a side view of the assembly of the first connector and the first optical transmission module in FIG. 4.
Figure 6A:
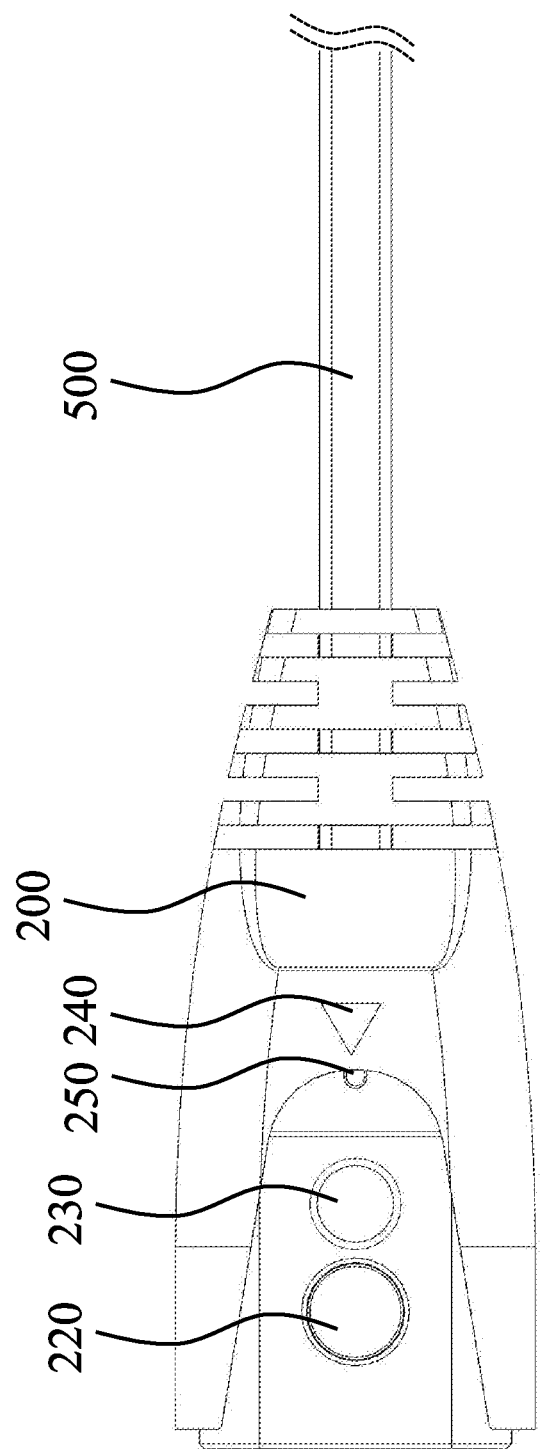
FIG. 6a illustrates a top view of the assembly of the second connector and the second optical transmission module in FIG. 4.
Figure 6B:
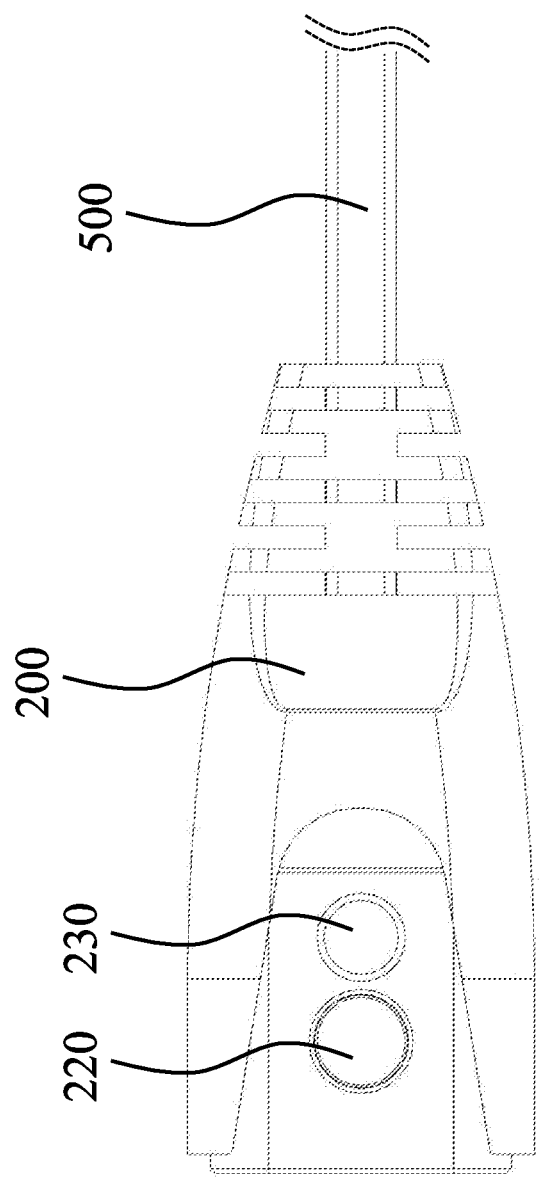
FIG. 6b illustrates a bottom view of the assembly of the second connector and the second optical transmission module in FIG. 4.
Figure 6C:
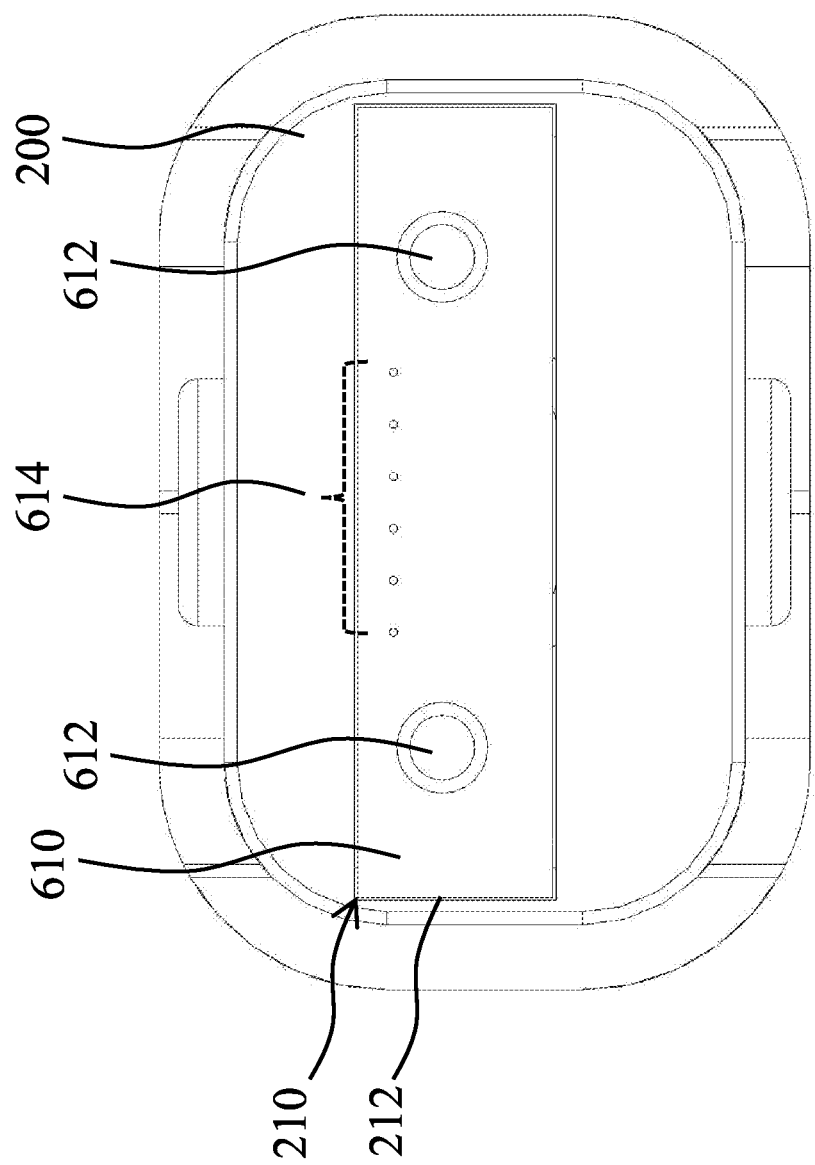
FIG. 6c illustrates a front view of the assembly of the second connector and the second optical transmission module in FIG. 4.
Figure 6D:
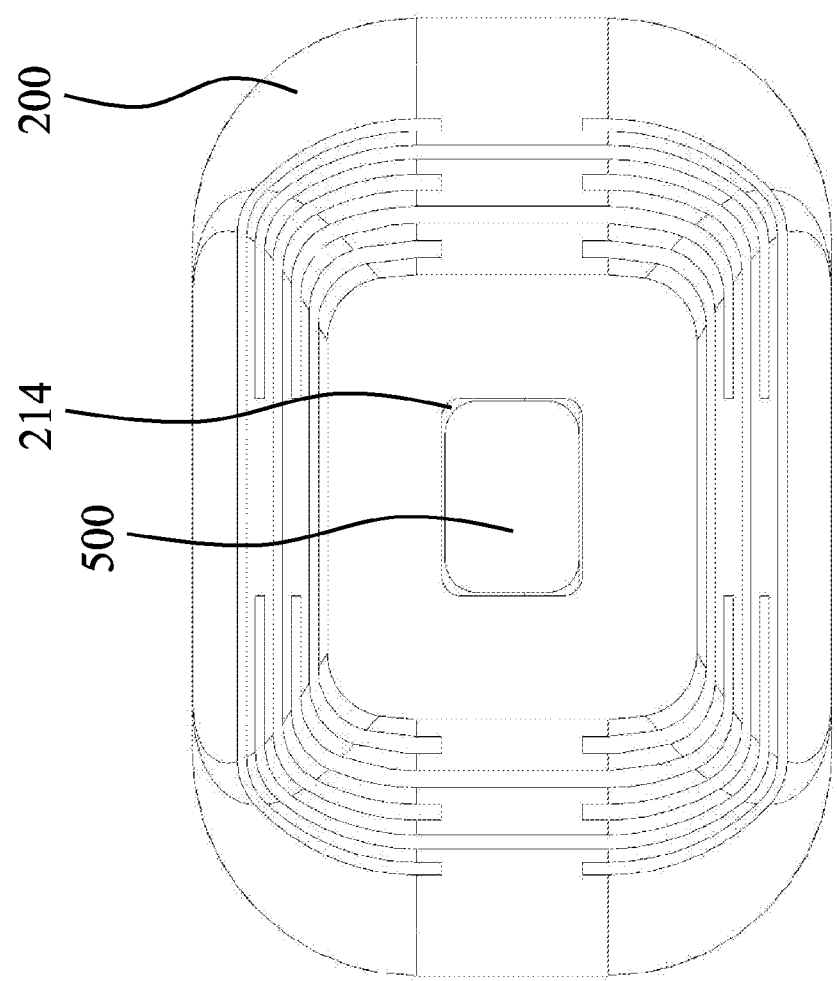
FIG. 6d illustrates a back view of the assembly of the second connector and the second optical transmission module in FIG. 4.
Figure 7:
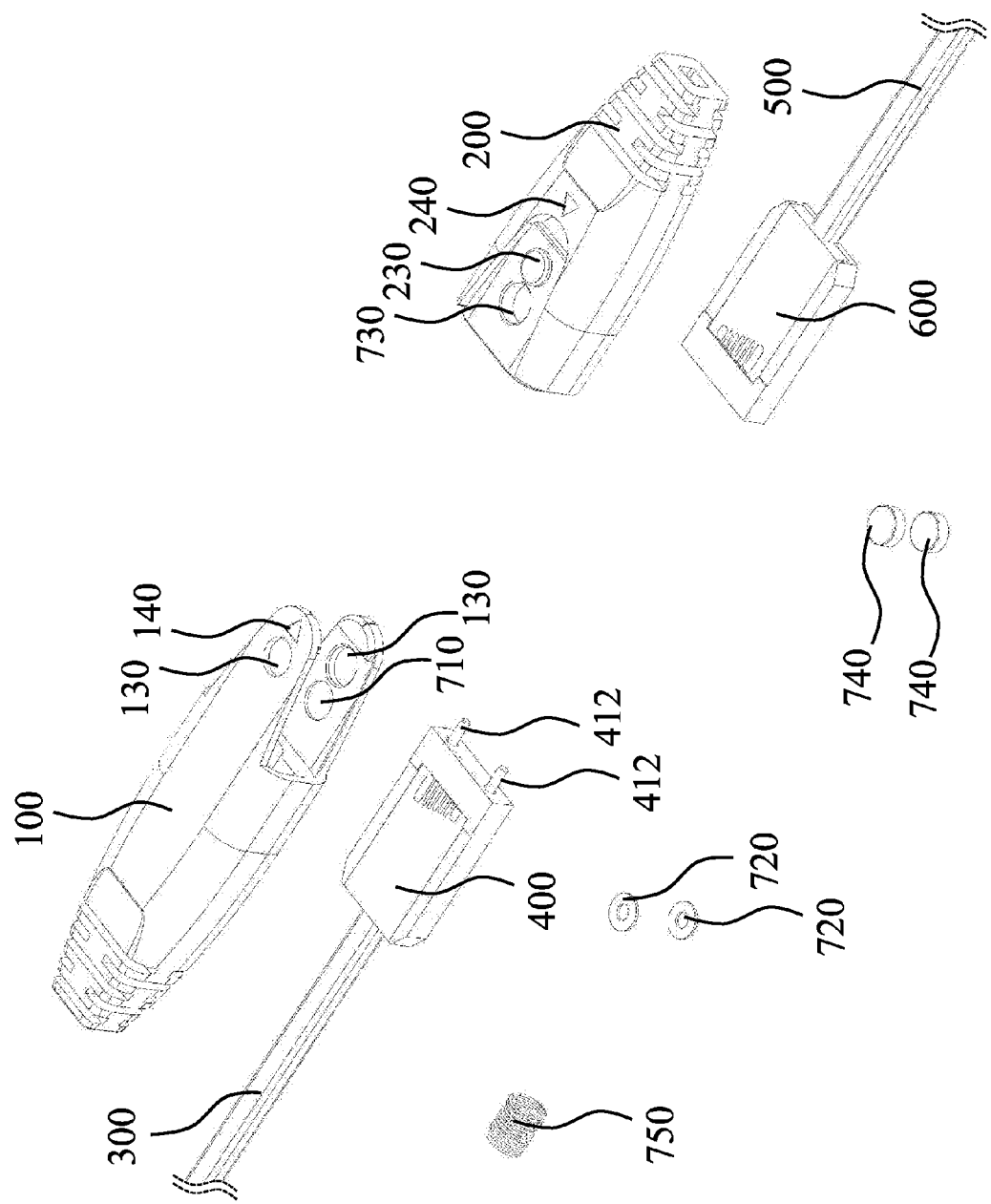
FIG. 7 illustrates the components of the optical transmission device of FIG. 4.
Figure 8:
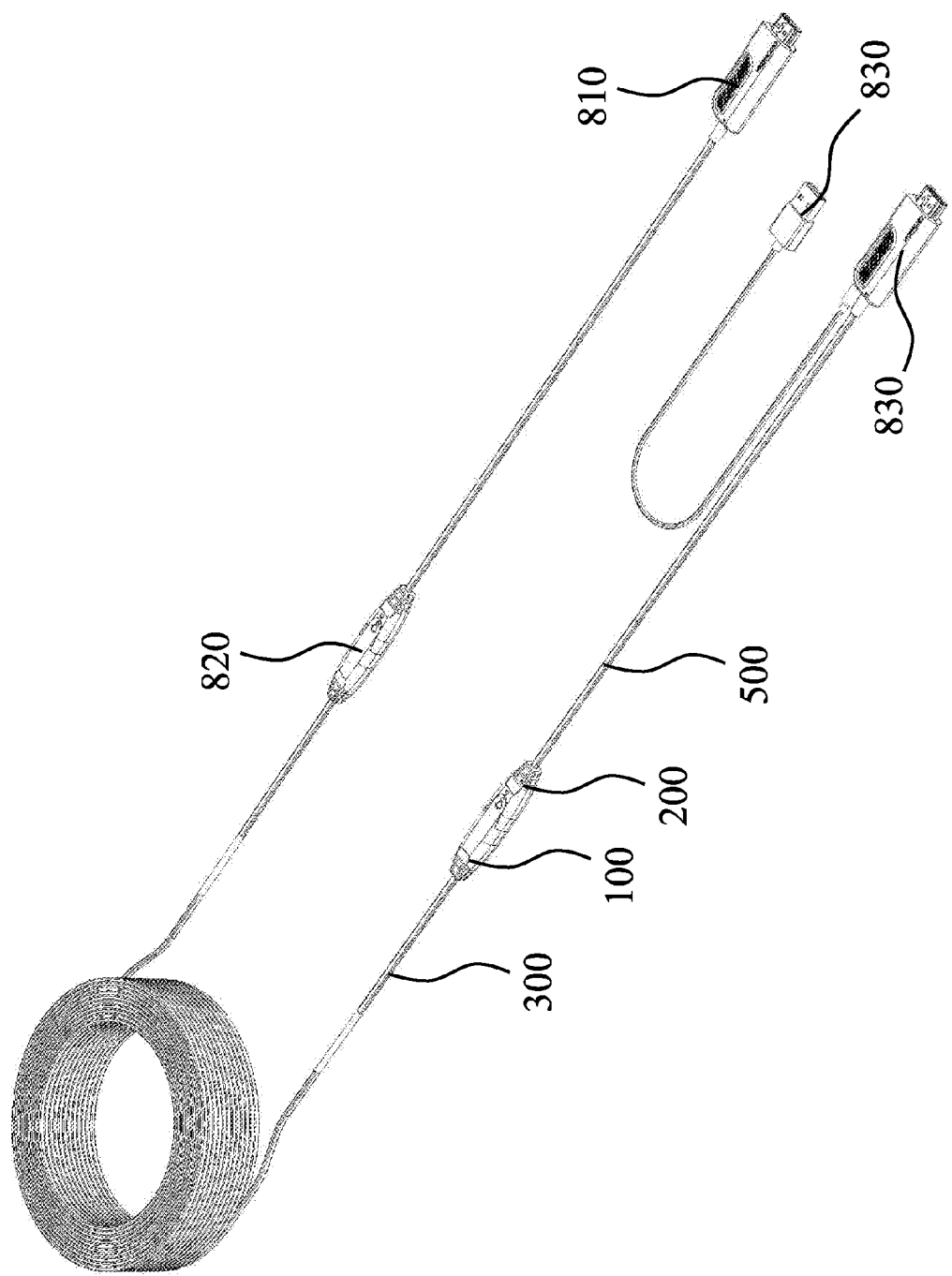
FIG. 8 illustrates an application of the optical transmission device of FIG. 4.

In addition to the fore-disclosed optical connector, the present invention also discloses an optical transmission device including the optical connector. Please refer to FIG. 4 through FIG. 8; FIG. 4 illustrates an embodiment of the optical transmission device of the present invention; FIG. 5*a* through FIG. 5*e* illustrate the assembly of the first connector and the first optical transmission module in different angles of view; FIG. 6*a* through FIG. 6*d* illustrates the assembly of the second connector and the second optical transmission module in different angles of view; FIG. 7 illustrates the components of the optical transmission device; and FIG. 8 illustrates an application of the optical transmission device. As it shown in the figures, the optical transmission device 40 comprises: a first optical transmission module including a first optical transmission line 300 and a first fiber joint 400; a second optical transmission module including a second optical transmission line 500 and a second fiber joint 600; a first connector 100; and a second connector 200. Like it is described in the preceding paragraphs, said first connector 100 includes: a first space 110, a first front opening 112, a first rear opening 114, and a first fastening 120; and said second connector 200 includes: a second space 210, a second front opening 212, a second rear opening 214 and a second fastening 220. The first space 110 is operable to accommodate the first fiber joint 400 and a portion of the first optical transmission line 300; the first front opening 112 is operable to expose a first signal transmission interface 410 of the first fiber joint 400; the first rear opening 114 is smaller than the first front opening 112 and operable to be the window for the first optical transmission line 300 connecting with the first fiber joint 400; and the first fastening 120 is integrated into the first connector 100 as a whole or installed as a part of the first connector 100, and operable to combine the first connector 100 with the second connector 200. Besides, the second space 210 is operable to accommodate the second fiber joint 600 and the portion of a second optical transmission line 500; the second front opening 212 is operable to expose a second signal transmission interface 610 of the second fiber joint 600; the second rear opening 214 is smaller than the second front opening 212 and operable to be the window for the second optical transmission line 500 connecting with the second fiber joint 600; and the second fastening 220 is operable to be fixed to the first fastening 120 in a detachable way, so as to connect the first and second connectors 100, 200, wherein the detachable way is nondestructive.

Since those of ordinary skill in the art can appreciate the implementation detail and modification of the first and second connectors 100, 200 of the present optical transmission device 40 by referring to the disclosure of the foresaid optical connector of the present invention, repeated and redundant description is therefore omitted. Please note that in this embodiment, the first signal transmission interface 410 includes a first alignment design 412 (e.g. a pin or its equivalent capable of alignment) and a first fiber signal transmission hole 414; the second signal transmission interface 610 includes a second alignment design 612 (e.g. a pin hole or its equivalent capable of alignment) and a second fiber signal transmission hole 614. Said first alignment design 412 and second alignment design 612 are matching and thereby allow the first and second signal transmission interfaces 410, 610 to be joined accurately and firmly. Please also note that as it is shown in FIG. 7, in order to make the first and second signal transmission interfaces 410, 610 closely meet, the present embodiment may further set a spring 750 at a position next to the first rear opening 114 in the first space 110, so as to allow the first optical transmission line 300 to pass through the first rear opening 114 and the spring 750, and then connect with the first fiber joint 400. In this way the resilience of the spring 750 is utilized to push the first fiber joint 400 forward, which therefore makes the first and second fiber joints 400, 600 closely meet, ensures the junction of the two optical faces seamless, and keeps the optical transmission efficiency good enough. Please further note that the present embodiment could be applicable to the connection between two terminal devices or treated as a part of a lone-distance fiber transmission route. For instance, as it is shown in FIG. 8, one end of the first optical transmission line 300 is connected with the first fiber joint 400 while the other end could be directly or indirectly connected with a first terminal device joint 810 or a third optical transmission module (e.g. the assembly of a third connector and a third fiber joint) 820; similarly, one end of the second optical transmission line 500 could be connected with the second fiber joint 600 while the other end could be directly or indirectly connected with a second terminal device joint 830 or a fourth optical transmission module (e.g. the assembly of a fourth connector and a fourth fiber joint) (not shown), wherein each of the first and second terminal device joints 810, 830 might include a video device joint (e.g. a HDMI joint, a USB joint or any suitable known video joints) or a communication device joint, and each of the third and fourth optical transmission modules might be an optical module like the first or second optical transmission module (e.g. each of the third and fourth connectors being identical to the first or second connector while each of the third and fourth fiber joints being identical to the first or second fiber joint).

Figure 9:
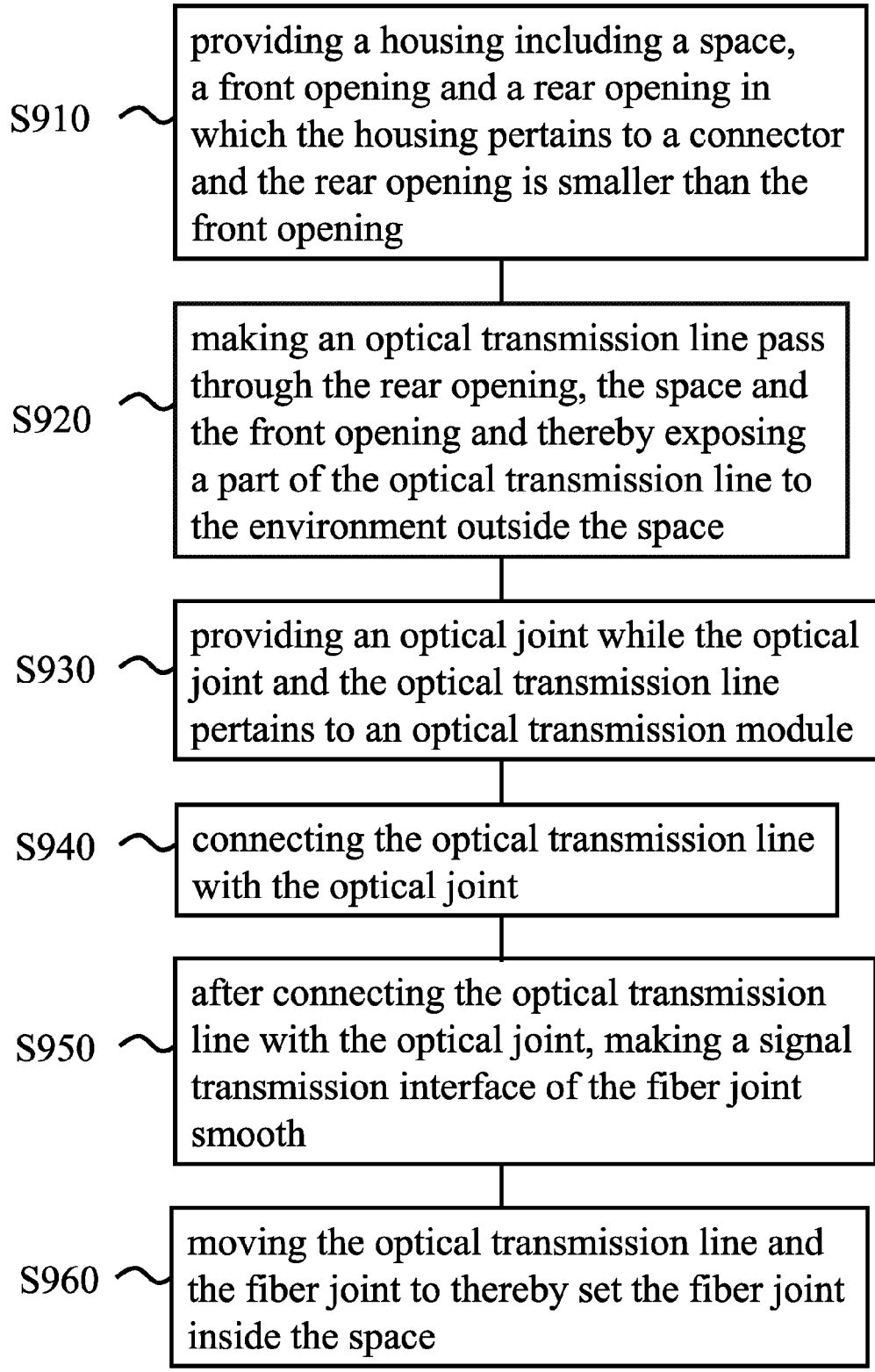
FIG. 9 illustrates the flow chart of an embodiment of the optical transmission device assembly method of the present invention.

In order to provide the aforementioned optical transmission device or its equivalent, the present invention further discloses an assembly method for an optical transmission device. This method is operable to assemble a connector and an optical transmission module in which the connector could be the foresaid first or second connector and the optical transmission module could be the foresaid first or second optical transmission module. As it is shown in FIG. 9, an embodiment of the assembly method comprises the following steps:

Step S910: providing a housing including a space, a front opening and a rear opening in which the housing pertains to a connector and the rear opening is smaller than the front opening.

Step S920: making an optical transmission line pass through the rear opening, the space and the front opening and thereby exposing a part of the optical transmission line to the environment outside the space.

Step S930: providing an optical joint while the optical joint and the optical transmission line pertains to an optical transmission module.

Step S940: connecting the optical transmission line with the optical joint.

Step S950: after connecting the optical transmission line with the optical joint, making a signal transmission interface of the fiber joint smooth. This step could be carried out by a polishing technique, a cutting technique or any appropriate known planarization technique.

Step S960: moving the optical transmission line and the fiber joint to thereby set the fiber joint inside the space.

On the basis of the above description, the present embodiment may join the optical transmission line and the fiber joint together after making the signal transmission interface of the fiber joint smooth. Of course it is also possible for the present embodiment to join the optical transmission line and the fiber joint together in step S940 before making the signal transmission interface smooth. Besides, the present embodiment may optionally carry out at least one of the following steps:

Step S915: setting a spring at a position near the rear opening in the space, wherein the optical transmission line passes through the rear opening and the spring. The arrangement and function of said spring has been well-explained in the preceding paragraphs.

Step S952: forming an alignment design (e.g. two pins or the equivalent thereof capable of alignment) on the signal transmission interface of the fiber joint; providing another optical transmission module including another optical transmission line and another fiber joint while the signal transmission interface of the another fiber joint includes another alignment design (e.g. two pin holes or the equivalent thereof capable of alignment); and connecting the signal transmission interface of the fiber joint with the signal transmission interface of the another fiber joint through the alignment design and the another alignment design.

Step S954: setting at least one fastening onto the housing; providing another connector including another fastening; and fixing the connector to the another connector through the fastening and the another fastening in a detachable way which is a nondestructive manner. However, people of ordinary skill in the art can integrate the above-mentioned fastening and the another fastening into the housing and the another connector respectively in light of their own requirements; or when the connector and the another connector are provided, said fastening and the another fastening could have been attached to the connector and the another connector respectively.

Since those of ordinary skill in the art can appreciate the implementation detail and modification of the present method invention by referring to the fore-disclosed device invention, provided that the remaining disclosure is enough for understanding and enablement, repeated and redundant description is omitted. Please note that the order of the steps of the method embodiment is not restricted to specific sequence as long as the consequent implementation is practicable.

To sum up. Through the structural design of the connector and/or the asymmetric design of the fiber joint of the optical transmission module, the optical connector, the optical transmission device and the assembly method of the present invention have the advantages of structure simplification, low fabrication cost, easy assembly procedure, and convenience in applications.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. An optical connector capable of coupling to two optical transmission assemblies through two independent connectors, comprising:
   a first connector operable to receive a part of a first optical transmission module, including:
      a first space operable to accommodate a first fiber joint and a portion of a first optical transmission line;
      a first front opening operable to expose a first signal transmission interface of the first fiber joint after the first space accommodates the part of the first optical transmission module;
      a first rear opening, smaller than the first front opening, operable to be the window for the first optical transmission line connecting with the first fiber joint after the first space accommodates the part of the first optical transmission module; and
      a first fastening; and
   a second connector operable to receive a part of a second optical transmission module, including:
      a second space operable to accommodate a second fiber joint and a portion of a second optical transmission line;
      a second front opening operable to expose a second signal transmission interface of the second fiber joint after the second space accommodates the part of the second optical transmission module;
      a second rear opening, smaller than the second front opening, operable to be the window for the second optical transmission line connecting with the second fiber joint after the second space accommodates the part of the second optical transmission module; and
      a second fastening operable to be fixed to the first fastening in a detachable way, so as to connect the first and second connectors, wherein the detachable way is nondestructive.

2. The optical connector of claim 1, wherein the first and second fastenings include at least a magnet and at least an iron element while the detachable way includes the way of magnetic attraction.

3. The optical connector of claim 1, wherein the outlines of the first and second fastenings closely meet while the detachable way includes the way of flexible contact or frictional contact.

4. The optical connector of claim 1, wherein the first connector further includes: at least a through hole operable to be hauled by external force after the first connector receives the part of the first optical transmission module.

5. The optical connector of claim 4, wherein the second connector further includes: at least a convex part operable to be in connection with the at least one through hole when the first and second connectors are combined with each other.

6. The optical connector of claim 1, wherein each of the first and second connectors includes an identification mark for proper connection.

7. The optical connector of claim 1, wherein the first and second connectors include a first foolproof design and a second foolproof design respectively, and the outlines of the first and second foolproof designs closely meet for proper connection.

8. The optical connector of claim 1, wherein the first front opening is located at a position other than the center of the first connector while the second front opening is located at a position other than the center of the second connector, so that the connection between the first and second connectors is confined to a predetermined alignment manner.

9. An optical transmission device, comprising:
   a first optical transmission module including a first fiber joint and a first optical transmission line;
   a second optical transmission module including a second fiber joint and a second optical transmission line;
   a first connector including:
      a first space operable to accommodate the first fiber joint and a portion of the first optical transmission line;
      a first front opening operable to expose a first signal transmission interface of the first fiber joint;
      a first rear opening, smaller than the first front opening, operable to be the window for the first optical transmission line connecting with the first fiber joint; and
      a first fastening; and a second connector including:
- a second space operable to accommodate the second fiber joint and a portion of the second optical transmission line;
- a second front opening operable to expose a second signal transmission interface of the second fiber joint;
- a second rear opening, smaller than the second front opening, operable to be the window for the second optical transmission line connecting with the second fiber joint; and
- a second fastening operable to be fixed to the first fastening in a detachable way, so as to connect the first and second connectors, wherein the detachable way is nondestructive.

10. The optical transmission device of claim 9, wherein the first and second fastenings include at least a magnet and at least an iron element while the detachable way includes the way of magnetic attraction.

11. The optical transmission device of claim 9, wherein the outlines of the first and second fastenings closely meet while the detachable way includes the way of flexible contact or frictional contact.

12. The optical transmission device of claim 9, wherein the first connector further includes: at least a through hole operable to be hauled by external force after the first connector accommodates the first fiber joint and the portion of the first optical transmission line.

13. The optical transmission device of claim 12, wherein the second connector further includes: at least a convex part operable to be in connection with the at least one through hole when the first and second connectors are combined with each other.

14. The optical transmission device of claim 9, wherein each of the first and second connectors includes an identification mark for proper connection.

15. The optical transmission device of claim 9, wherein the first and second connectors include a first foolproof design and a second foolproof design respectively, and the outlines of the first and second foolproof designs closely meet for proper connection.

16. The optical transmission device of claim 9, wherein the first front opening is located at a position other than the center of the first connector while the second front opening is located at a position other than the center of the second connector, so that the connection between the first and second connectors is confined to a predetermined alignment manner.

17. The optical transmission device of claim 9, wherein the first signal transmission interface includes a first alignment design and the second signal transmission interface includes a second alignment design while the first and second alignment designs are operable to closely meet, so that the connection between the first and second signal transmission interfaces is confined to a predetermined alignment manner.

18. The optical transmission device of claim 17, wherein the first alignment design includes an alignment element and the second alignment design includes an alignment hole while the alignment element and the alignment hole are operable to closely meet.

19. The optical transmission device of claim 9, further comprising: a spring which is set at the position next to the first rear opening in the first space, wherein the first optical transmission line passes through the first rear opening and the spring and connects with the first fiber joint.

20. The optical transmission device of claim 9, wherein an end of the first optical transmission line is connected with the first fiber joint while another end of the first optical transmission line is connected with a first terminal device joint or a third optical transmission module; and an end of the second optical transmission line is connected with the second fiber joint while another end of the second optical transmission line is connected with a second terminal device joint or a fourth optical transmission module.

21. The optical transmission device of claim 20, wherein each of the first and second terminal devices includes one of a video device joint and a communication device joint.

22. The optical transmission device of claim 20, wherein each of the third and fourth optical transmission assemblies is associated with the first or second optical transmission module.

23. An assembly method for an optical transmission device, operable to assemble a connector and an optical transmission module, comprising:
- providing a housing including a space, a front opening and a rear opening in which the housing pertains to the connector and the rear opening is smaller than the front opening;
- making an optical transmission line pass through the rear opening, the space and the front opening and thereby exposing a part of the optical transmission line to the environment outside the space;
- providing an optical joint in which the optical joint and the optical transmission line pertains to the optical transmission module;
- connecting the optical transmission line with the optical joint;
- after connecting the optical transmission line with the optical joint, making a signal transmission interface of the fiber joint smooth; and
- moving the optical transmission line and the fiber joint to thereby set the fiber joint inside the space.

24. The assembly method of claim 23, further comprising: after making the signal transmission interface of the fiber joint smooth, fixing the optical transmission line to the fiber joint.

25. The assembly method of claim 23, further comprising: setting a spring at a position next to the rear opening in the space, wherein the optical transmission line passes through the rear opening and the spring.

26. The assembly method of claim 23, further comprising:
- forming an alignment design on the signal transmission interface of the fiber joint;
- providing another optical transmission module including another optical transmission line and another fiber joint while the signal transmission interface of the another fiber joint includes another alignment design; and
- connecting the signal transmission interface of the fiber joint with the signal transmission interface of the another fiber joint through the alignment design and the another alignment design.

27. The assembly method of claim 23, further comprising:
- setting a fastening onto the housing;
- providing another connector including another fastening; and
- fixing the connector to the another connector in a detachable way through the fastening and the another fastening in which the detachable way is nondestructive.

28. The assembly method of claim 23, wherein the housing includes a fastening and the assembly method further comprises:
- providing another connector including another fastening; and fixing the connector to the another connector in a detachable way through the fastening and the another fastening in which the detachable way is nondestructive.

\* \* \* \* \*